United States Patent Office 2,855,717
Patented Oct. 14, 1958

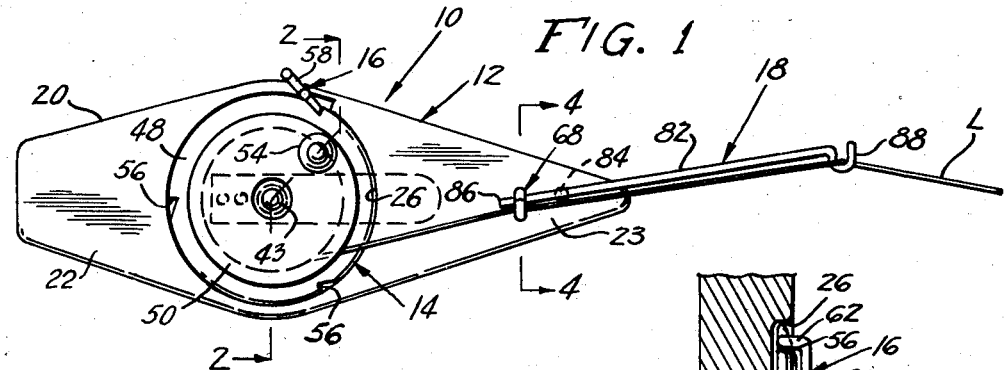
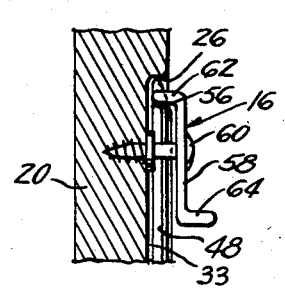
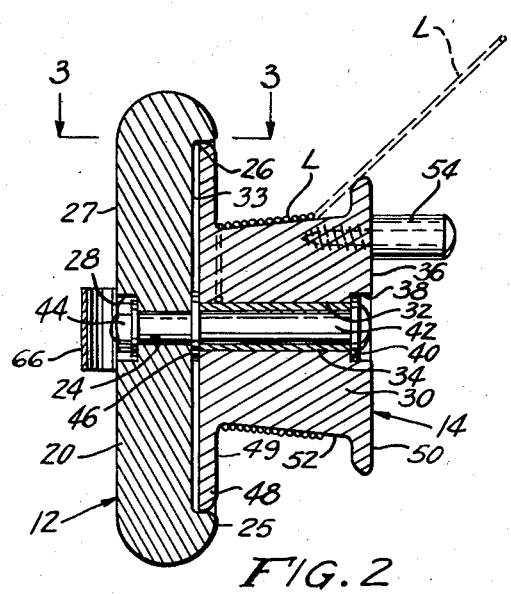
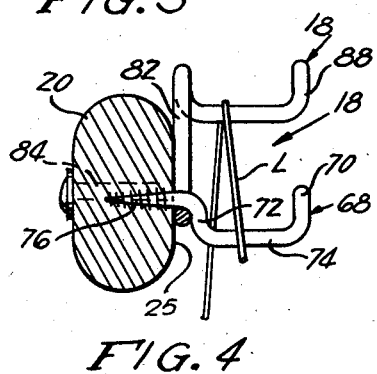
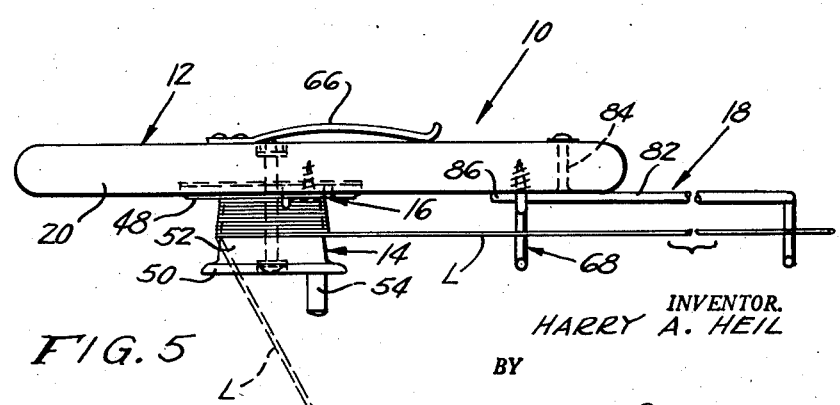

2,855,717

FISHING REEL AND HOLDER

Harry A. Heil, Milltown, N. J.

Application August 21, 1956, Serial No. 605,338

2 Claims. (Cl. 43—18)

This invention relates to an improved fishing line reel and holder.

The primary object of the invention is to provide a more practical and efficient device of this kind whose fishing line guide means is collapsible or foldable from a forwardly projecting position to a rearwardly extending position along the body of the device, so as to reduce the length of the device for transportation and storage, the device further having manually operable ratchet detent means for its reel.

Another object of the invention is to provide a device of the character indicated above which is simple in construction, composed of a small number of simple and easily assembled parts, and which can be made in attractive, rugged, and serviceable forms at relatively low cost.

These together with other objects and advantages which will become apparent, reside in the details of construction and operation as more fully hereinafter described and claimed, reference being had to the accompanying drawings forming a part hereof, wherein like numerals refer to like parts throughout the several views, and in which:

Figure 1 is a side elevational view of the fishing line reel and holder of the invention;

Figure 2 is an enlarged transverse sectional view taken substantially on line 2—2 of Figure 1;

Figure 3 is a fragmentary longitudinal sectional view taken substantially on line 3—3 of Figure 2, showing details of the latch means;

Figure 4 is an enlarged transverse sectional view taken substantially on line 4—4 of Figure 1; and Figure 5 is a contracted top plan view of Figure 1.

Referring to the drawings in detail, the illustrated device, indicated generally at 10, comprises a body 12 supporting a laterally extending reel 14, the reel 14 being retained in a fixed position for casting by means of latch means 16, and line guide means, indicated generally at 18, for a fishing line L.

The body 12, which can be constructed of any suitable material, such as wood, plastic, or the like, comprises an elongated flat plate 20 having a tapered rear end portion 22 forming a comfortable butt which may be pressed against the body for steadying the device when making a retrieve, and having a forwardly tapered forward end portion 23, which forms a comfortable hand hold when making a retrieve, see Figure 1. The longitudinal edges of the plate 20, see Figures 2 and 4, are rounded for comfortable holding and manipulation of the device.

Extending transversely through a central portion of the plate 20 is a transverse bore 24, and surrounding the bore 24 in the outboard side 25 of the plate 20 is a large diameter circular recess 26, the inboard side 27 of the plate 20 having a relatively small diameter recess 28 surrounding the bore 24.

The reel 14 comprises a preferably solid spool 30 having an axial bore 32 extending therethrough which has disposed therein a sleeve 34. The outer end 36 of the spool 30 has therein a recess 38 in which is disposed a washer 40. A reel shaft 42 extends through the sleeve 34 and through the bore 32 in the plate 20, see Figure 2, and a nut 44 is threaded on the inboard end of the shaft 32 within the recess 28. A washer 46 on the shaft 42 is interposed between the inner end of the sleeve 34 and the bottom 33 of the recess 26 of the plate 20. The shaft 42 has a head 43 on its outboard end which engages the outer side of the washer 40.

The spool 30 has on its inner end a relatively large diameter flange 48 running in the recess 26 and having an outboard side 49 substantially flush with the outboard side 25 of the plate 20. On the outer end of the spool 30 is a smaller diameter flange 50. The spindle portion 52 of the spool 30 is tapered in an inboard direction, and wound thereon is a fishing line L.

Extending laterally from the outboard end 36 of spool 30 is an eccentric crank handle 54 for rotating the spool 30.

The inner flange 48 of the spool 30 has formed in the peripheral edge thereof circumferentially spaced ratchet notches 56, see Figure 1, with which is engageable the latch means 16 mentioned above. The latch means 16 comprises a detent arm 58 having a pivot, such as a screw 60, extending through an intermediate portion thereof, the screw 60 being threaded into the outboard side 25 of the plate 20. The detent arm 58 has a lateral detent lug 62 on its inward end which is engageable in any one of the ratchet notches 56 for preventing unwinding rotation of the spool 30. On the outer end of the arm 58 is a laterally outwardly extending handle portion 64 which is adapted to be depressed rearwardly and downwardly from the position shown in Figure 1, to disengage the detent lug 62 from a notch 56, so as to free the spool 30 for rotation in either direction. The detent lug 62 is to be held engaged in a notch 56 when the line L is to be cast. A casting operation comprises grasping the body 12 in the left hand, for example, and drawing approximately two feet of line from the spool 30, and then throwing the line, which must include a sinker on the free end thereof, in the manner of a cast, and letting the line L be drawn off the spool 30 in the manner of a spinning reel. In this operation, the detent arm 58 is held tightly so that the detent lug 62 can be ratcheted out of the notches 56. When enough line has been paid out in this manner, the detent arm 58 is held, so as to retain the lug 62 in a notch 56 and prevent unwinding rotation of the spool 30.

For the purposes of convenience in carrying the device, the body 12 has suitably secured on the inboard side 27 thereof a longitudinally extending resilient strap 66 which can be slipped over a belt of a user of the device. However, the device is not intended to be used for fishing while thus suspended from a belt.

The line guide means 18 comprises a rear U-shaped guide element 68, see Figure 4, for example, which includes outer and inner legs 70 and 72 connected by a transverse bight portion 74, the inner leg 72 terminating in a right angularly disposed threaded screw portion 76 which is threaded into the outboard side 25 of the forward end portion 23 of the plate 20, as clearly seen in Figure 4. The guide means 18 further includes an elongated resilient feeler rod 82 having near its rear end a lateral pivot pin 84 extending through the forward end portion 23 of the plate 20 at a point forward of the screw 76. The rod 82 has a rear end portion 86 behind the pivot pin 84 which is engageable beneath the screw 76 of the rear guide 68, between the outboard side 25 of the plate 20 and the inner leg 72 of the guide 68, see Figure 4. The forward end of the rod 82 is formed into a forward U-shaped guide 88 which is in substantial alignment with the rear guide 68, and is also engageable by an intermediate portion of the fishing line L. When the line guide 18 is disposed in the position above described, and shown in Figure 1, and a fish is hooked on the line L, the resilient rod 82 provides a "natural" feel while playing the fish, which is customarily found in conventional casting rods. When the device is to be transported or stored, the line guide 18 may be rotated rearwardly and downwardly to lie upon the spool 30 along the outboard side 25 of the plate 20.

The foregoing is considered illustrative only of the principles of the invention. Since numerous modifications and changes will readily occur to those skilled in the art, it is not desired to limit the invention to the exact construction and operation shown and described, and accordingly, all suitable modifications and equivalents may be resorted to, as fall within the scope of the appended claims.

What is claimed as new is as follows:

1. In a fishing line reel and holder, a body comprising an elongated flat plate having inboard and outboard sides and rear and forward end portions, line guide means at the outboard side of the plate comprising a stationary U-shaped rear line guide having outer and inner legs and an element on the inner leg extending laterally to and secured to the outboard side of said plate, said inner leg being laterally outwardly spaced from the outboard side of the plate, an elongated rod normally extending lengthwise along said outboard side of the plate and extending forwardly beyond said forward end portion of the plate, a lateral pivot pin on said rod near its rear end, said pivot pin traversing said forward end portion of the plate at a point forwardly of said rear line guide, said rod having a forward end formed into a U-shaped front line guide, said rod having a rear end portion behind said pivot pin normally engaged beneath said element and between the outboard side of the plate and the inner leg of the rear line guide, said rod being arranged to be swung rearwardly to lie along the outboard side of the plate above said rear line guide so as to decrease the overall length of the holder for storage.

2. In a fishing line reel and holder, a body comprising an elongated flat plate having inboard and outboard sides and rear and forward end portions, line guide means at the outboard side of the plate comprising a stationary rear line guide having an inner leg secured to the outboard side of said plate, said inner leg being laterally outwardly spaced from the outboard side of the plate, an elongated rod normally extending lengthwise along said outboard side of the plate and extending forwardly beyond said forward end portion of the plate, and a lateral pivot pin on said rod near its rear end, said pivot pin traversing said forward end portion of the plate at a point forwardly of said rear line guide, said rod having a forward end formed into a front line guide, said rod having a rear end portion behind said pivot pin normally engaged beneath said element and between the outboard side of the plate and the inner leg of the rear line guide, said rod being arranged to be swung rearwardly to lie along the outboard side of the plate above said rear line guide so as to decrease the overall length of the holder for storage.

References Cited in the file of this patent

UNITED STATES PATENTS

| | | |
|---|---|---|
| 110,535 | Altemus | Dec. 27, 1870 |
| 803,105 | Keating | Oct. 31, 1905 |
| 1,945,068 | Noyes | Jan. 30, 1934 |
| 2,479,946 | Lofgren | Aug. 23, 1949 |
| 2,483,696 | Giera | Oct. 4, 1949 |
| 2,508,809 | Allen | May 23, 1950 |
| 2,561,237 | Shafer | July 17, 1951 |
| 2,721,412 | Smiley | Oct. 25, 1955 |